(12) United States Patent  (10) Patent No.: US 8,931,628 B2
Hill  (45) Date of Patent: Jan. 13, 2015

(54) AUTOMATED FACE CONVEYOR CHAIN TENSION LOAD SENSOR IN CHAIN TENSION PLATE

(75) Inventor: Nigel Hill, Eckington (GB)

(73) Assignee: Joy MM Delaware, Inc., Wilmington, DE (US)

( * ) Notice: Subject to any disclaimer, the term of this patent is extended or adjusted under 35 U.S.C. 154(b) by 1011 days.

(21) Appl. No.: 12/767,398

(22) Filed: Apr. 26, 2010

(65) Prior Publication Data

US 2010/0270128 A1 Oct. 28, 2010

(30) Foreign Application Priority Data

Apr. 28, 2009 (GB) .................................. 907265.3

(51) Int. Cl.
| | | |
|---|---|---|
| B65G 43/00 | (2006.01) | |
| B65G 23/44 | (2006.01) | |
| B65G 43/02 | (2006.01) | |
| B65G 43/06 | (2006.01) | |

(52) U.S. Cl.
CPC ................ B65G 23/44 (2013.01); B65G 43/02 (2013.01); B65G 43/06 (2013.01)
USPC ...................... 198/810.04; 198/813

(58) Field of Classification Search
USPC ............................ 198/810.04, 813
See application file for complete search history.

(56) References Cited

U.S. PATENT DOCUMENTS

| | | |
|---|---|---|
| 2,527,452 A | 10/1950 | Rose |
| 2,732,056 A | 1/1956 | Pearson |
| 2,766,871 A | 10/1956 | Arentzen |
| 2,895,591 A | 7/1959 | Frellsen |
| 3,181,691 A | 5/1965 | Kagley |
| 3,675,482 A | 7/1972 | Hewitt |
| 3,718,250 A | 2/1973 | Bosworth et al. |
| 3,911,764 A | 10/1975 | Duggan |
| 3,926,304 A | 12/1975 | Watabe |
| 3,963,115 A | 6/1976 | Teske et al. |
| 4,037,876 A | 7/1977 | Georg et al. |
| 4,088,224 A * | 5/1978 | Kittredge ..................... 198/783 |
| 4,090,601 A | 5/1978 | Freed |

(Continued)

FOREIGN PATENT DOCUMENTS

| | | |
|---|---|---|
| CN | 2435368 | 6/2001 |
| CN | 2545156 | 4/2003 |

(Continued)

OTHER PUBLICATIONS

United Kingdom Intellectual Property Office Search Report for Application No. GB0907258.8 dated Apr. 8, 2010, 2 pages.

(Continued)

*Primary Examiner* — Joseph Dillon, Jr.
(74) *Attorney, Agent, or Firm* — Michael Best & Friedrich LLP

(57) ABSTRACT

A device is provided for detecting and adjusting the tension of the scraper chain. The device identifies broken chain as it leaves the return sprocket and enters the top race of the conveyor. When detected, the chain can be stopped automatically by the armored face conveyor control system, to avoid the potential for further damage, and warn the operators that repair of the chain is required.

The device also provides a conveyor with sliding frames at both ends to allow the conveyor ends to be independently adjusted to each end of the coal block, whilst maintaining good chain tension and control.

20 Claims, 9 Drawing Sheets

(56) References Cited

U.S. PATENT DOCUMENTS

| | | | |
|---|---|---|---|
| 4,120,390 A | 10/1978 | Montgomery | |
| 4,133,455 A * | 1/1979 | Moser | 222/77 |
| 4,155,600 A | 5/1979 | Lanfermann et al. | |
| 4,372,172 A | 2/1983 | Gombócz et al. | |
| 4,389,072 A | 6/1983 | Linke et al. | |
| 4,533,856 A | 8/1985 | Malone | |
| 4,657,131 A | 4/1987 | Brychta et al. | |
| 5,119,893 A | 6/1992 | Jost | |
| 5,131,528 A | 7/1992 | Bandy, Jr. | |
| 5,482,154 A | 1/1996 | Affeldt et al. | |
| 5,505,293 A | 4/1996 | Ochs et al. | |
| 5,624,162 A | 4/1997 | Guse et al. | |
| 5,632,372 A | 5/1997 | Steinbuchel, IV et al. | |
| 5,641,058 A | 6/1997 | Merten et al. | |
| 5,647,640 A | 7/1997 | Heintzmann et al. | |
| 5,736,652 A | 4/1998 | Strubbe | |
| 5,895,332 A | 4/1999 | Olson et al. | |
| 5,997,423 A | 12/1999 | Kwon | |
| 6,131,727 A | 10/2000 | Nelson | |
| 6,545,231 B1 | 4/2003 | Häfner | |
| 6,695,130 B1 | 2/2004 | Baylock et al. | |
| 6,708,817 B2 | 3/2004 | Klabisch et al. | |
| 6,715,601 B2 | 4/2004 | Abel et al. | |
| 6,925,890 B2 | 8/2005 | Fontenot | |
| 7,117,989 B2 | 10/2006 | Weigel et al. | |
| 7,540,374 B2 | 6/2009 | Rathbun et al. | |
| 7,600,822 B2 | 10/2009 | Klabisch et al. | |
| 7,793,775 B2 | 9/2010 | Rozenfield et al. | |
| 8,061,510 B2 | 11/2011 | Tout | |
| 8,061,691 B2 | 11/2011 | Levy et al. | |
| 8,191,703 B2 * | 6/2012 | Tokhtuev et al. | 198/810.04 |
| 8,286,788 B2 * | 10/2012 | Massotte et al. | 198/861.1 |
| 8,550,236 B2 * | 10/2013 | Merten et al. | 198/810.04 |
| 8,636,140 B2 * | 1/2014 | Tout et al. | 198/814 |
| 2005/0000367 A1 | 1/2005 | Meade | |
| 2006/0021858 A1 | 2/2006 | Sherwood | |
| 2010/0031981 A1 | 2/2010 | Gaus et al. | |
| 2010/0065405 A1 * | 3/2010 | Lagneaux | 198/853 |
| 2010/0200118 A1 * | 8/2010 | Krauss et al. | 144/357 |
| 2010/0270128 A1 | 10/2010 | Hill | |
| 2010/0270130 A1 | 10/2010 | Tout | |
| 2010/0270131 A1 | 10/2010 | Vasey | |
| 2011/0024268 A1 | 2/2011 | Merten et al. | |
| 2012/0118707 A1 * | 5/2012 | Tout et al. | 198/810.02 |
| 2013/0015043 A1 * | 1/2013 | Tout et al. | 198/810.04 |
| 2013/0068594 A1 * | 3/2013 | Worthington et al. | 198/810.04 |
| 2013/0146425 A1 | 6/2013 | Tokhtuev | |
| 2014/0190796 A1 | 7/2014 | Tout et al. | |

FOREIGN PATENT DOCUMENTS

| | | |
|---|---|---|
| CN | 2607343 | 3/2004 |
| CN | 1576194 | 2/2005 |
| CN | 2703258 | 6/2005 |
| CN | 1661346 | 8/2005 |
| CN | 2795141 | 7/2006 |
| CN | 2832748 | 11/2006 |
| CN | 2937026 | 8/2007 |
| CN | 101948045 | 1/2011 |
| CN | 201801141 | 4/2011 |
| DE | 2017949 | 10/1971 |
| EP | 1310700 | 5/2003 |
| GB | 2095721 | 10/1982 |
| GB | 2346663 | 8/2000 |
| GB | 2471826 | 1/2011 |
| GB | 2493269 | 1/2013 |
| JP | 55130416 | 9/1980 |
| JP | 2005298173 | 10/2005 |
| SU | 844450 | 7/1981 |
| WO | 2010/028783 | 3/2010 |

OTHER PUBLICATIONS

United Kingdom Intellectual Property Office Search Report for Application No. GB0907256.2 dated Apr. 12, 2010, 8 pages.
United Kingdom Intellectual Property Office Examination Report for Application No. GB0907256.2 dated May 21, 2012, 2 pages.
Office Action from the United States Patent and Trademark Office for U.S. Appl. No. 12/767,406 dated Jun. 21, 2012, 13 pages.
GB0907265.3 Search Report dated May 10, 2010.
United Kingdom Intellectual Property Office Examination Report for Application No. GB0907258.8 dated Feb. 12, 2013 (2 pages).
Chinese First Office Action for Application No. 201010167738.9 dated Sep. 3, 2013 (6 pages, English translation only).
Russian Office Action for Russian Application No. 2010116142 dated Oct. 30, 2013 (7 pages).
Office Action from the United States Patent and Trademark Office for U.S. Appl. No. 13/553,487 dated May 30, 2013 (4 pages).
Russian Office Action for Russian Application No. 2012132480 dated Sep. 13, 2013 (5 pages).
First Office Action from the Australian Intellectual Property Office for Application No. 2010201413 dated Jan. 9, 2013 (3 pages).
First Office Action from the Australian Intellectual Property Office for Application No. 2012205258 dated Jun. 17, 2014 (4 pages).
Office Action from the United States Patent and Trademark Office for U.S. Appl. No. 13/297,067 dated May 28, 2014 (29 pages).
United States Patent Office Action for U.S. Appl. No. 12/767,406 dated Apr. 9, 2014 (18 pages).
United States Patent Office Action for U.S. Appl. No. 12/767,406 dated Jun. 13, 2012 (12 pages).
United States Patent Office Notice of Allowance for U.S. Appl. No. 13/553,487 dated Sep. 19, 2013 (6 pages).
United States Patent Office Action for U.S. Appl. No. 12/767,411 dated Mar. 11, 2011 (6 pages).
United States Patent Office Notice of Allowance for U.S. Appl. No. 12/767,411 dated Jul. 19, 2011 (5 pages).
AU2010201412 Patent Examination Report No. 1 dated Jun. 12, 2013 (4 pages).
CN201010167675.7 First Office Action dated Sep. 27, 2013 (20 pages with English translation).
Notification of First Office Action from State Intellectual Property Office of the People's Republic of China for Application No. 201210257008.7 dated Jul. 22, 2014 (5 pages).
Patent Examination Report No. 2 from IP Australia for Application No. 2010201413 dated Aug. 13, 2014 (3 pages).

* cited by examiner

AUTOMATED FACE CONVEYOR CHAIN TENSION LOAD SENSOR IN CHAIN TENSION PLATE

BACKGROUND

This disclosure relates to a mechanism to control the position of a scraper chain conveyor and for detection and adjustment of the tension of a scraper chain of a chain conveyor.

Conveyors, such as armored face conveyors, are part of an integrated longwall system that also comprises a coal-cutting machine and roof supports. As the longwall system removes mineral from the mineral block one strip (web) at a time, the load on the conveyor changes as the cutter moves along the conveyor. The conveyor progressively moves forward one web in order to reposition itself for the next cut.

The mineral being mined is dragged along a top race of the conveyor by a continuous chain and flight-bar assembly driven by sprockets at each end of the conveyor. More particularly, spaced apart chains, with the flight bars connecting the chains, are typical. At the delivery end, the mineral is discharged onto an adjacent conveyor while the continuous chain enters a bottom race where it proceeds to a return end, where a return end drum or sprocket reverses the direction of the chain.

Armored face conveyors normally operate at a fixed overall length (sprocket centers), but more usually they are fitted with an extendable return end frame. The purpose of the extendable return end frame is to take-up slack chain generated during normal operations. The variations in load and the repositioning of the many parts of the conveying system result in changes in chain tensions. To ensure slack chain is not produced, the movement of the extendable return end frame is sometimes automatically controlled to maintain a fixed chain tension.

This repeated action involves the repositioning of the many parts that make-up the total conveying system. Keeping the equipment inline with the coal block is difficult, as no direct steering mechanism is available with these systems. The operators have to rely on their experience by adjusting the relative position of the conveyor to the coal block to counteract a tendency of the equipment to gradually creep sideways. This inevitably results in face creep with the only corrective action available to the operators being to angle the conveyor a few degrees off square to the coal block. This is very slow and extremely difficult to gauge.

In certain operational situations, one of the two chains of the chain and flight bar assembly may get broken on the top race. The remaining chain can then enter the return race with the broken chain. Lower tensions in the bottom race can be contained by the single chain, which continues to the return end and then over the return end sprocket. If the broken chain is not identified on the top race, the result will be failure of the second chain, which is most likely when it approaches the discharge area. Consequence damage to related equipment can then occur. Failure is followed by prolonged down time to make a repair. Visual identification of the broken chain is possible, but is unlikely because the chain is covered with the mineral being conveyed. Additionally, on most installations, safety requirements prohibit operators from being adjacent the return end of the conveyor, which further reduces the opportunity for manual detection.

FIG. 1, which is taken from Bandy U.S. Pat. No. 5,131,528, illustrates a prior art scraper chain conveyor. FIG. 1 illustrates in simple form the various conveyor elements necessary for understanding of the conveyor equipment environment. The conveyor apparatus or assembly is shown generally by the character numeral 10 and includes a drive drum/sprocket 12 and an idler or guide drum/sprocket 14 separated by a span of a flexible conveyor 16, illustrated partially in dashed line outline. As depicted, the conveyor 16 comprises dual conveyor chains 18 and a multiplicity of spaced flight bars 20 attached to the dual chains 18. During operation of the conveyor assembly, the flight bars 20 push aggregate material, such as mined coal, along an underlying conveyor pan 21. The conveyor assembly 10 is typically positioned juxtaposed to a mine wall where a seam of material is being mined for transporting the material to one end. The material is then transferred to an auxiliary conveyor for further disposition.

The drum/sprocket 12 is appropriately coupled to a conveyor drive motor 22. Operation of motor 22 causes the sprocket intermeshing with the dual chains 18 to advance the conveyor 16. A pair of sidewalls 24 forming a first portion of a "split frame" of conveyor assembly 10 serves to rotatably support the drum/sprocket 12. The sidewalls 24 are illustrated as being telescopingly engaged with a second pair of sidewalls 26 forming a second portion of the frame and, collectively with sidewalls 24, comprise the aforementioned split frame. The telescoping joint, indicated generally by character numeral 48, permits the frame portions to be moved relative to one another.

The idler drum/sprocket 14 is appropriately mounted for rotary movement between sidewalls 26. Relative movement at the joint 48 between the adjacent sidewalls 24 and 26 thus causes the distance span between the drum/sprockets 12 and 14 to vary accordingly. The dual conveyor chains 18 can be provided with increased or reduced tension depending upon the direction of adjusting movement of the supporting drum/sprockets with respect to each other. To provide this relative movement, assembly 10 has a tensioning means in the form of a pair of hydraulic cylinders 28 and 30, each mounted on and secured to an adjacent sidewall 26. In other embodiments (not shown), only a single hydraulic cylinder can be used. The cylinders have respective pistons 32 and 34, each of which is operatively coupled to a sidewall 24 in any known and expedient manner.

Movement of the pistons 32 and 34 causes the first portion of the conveyor 16 represented by the side walls 24 to move longitudinally relative to the second portion and side walls 26, thus relaxing or tensioning the chain 18, as desired. Control of movement of pistons 32 and 34 is affected by a conventional hydraulic tensioning control circuitry, depicted generally by numeral 40 in FIG. 1.

As stated above, a certain amount of tensioning of conveyor chain 18 is essential for the proper and efficient operation of the conveyor assembly 10. Too little tension may cause the conveyor chain to ride up the teeth of the sprockets, and even eventually, under severe conditions, become disengaged. Conversely, too much tension may cause the conveyor components to be over stressed, increasing the risk of mechanical failure in the various parts of the conveyor apparatus.

FIG. 2, which is taken from Weigel et al U.S. Pat. No. 7,117,989, illustrates a prior art mechanism for controlling the tension in a scraper chain in a conveyor. FIG. 2 shows a tensionable return station, marked as 51, which forms the auxiliary drive of a face conveyor, and on which a spoked chain wheel 52 is located, which may be powered by drives (not shown).

All channel sections 70 and machine frame 51 and, where applicable, any intermediate or transitional channels located between them, have a top race 54 A and a bottom race 54 B. In top race 54 A the material to be conveyed, such as coal, is transported by means of scrapers 20 as far as the main drive, and in bottom race 54 B the scrapers run back to the auxiliary drive. The constantly changing load conditions in the top race cause the tension in the top race and bottom race sections of conveyor 16 to vary.

In order to detect the tension of conveyor 16, a sensor, indicated overall by 60, is located on the frame of return station 51, which forms the auxiliary drive. The sensor has a sliding body or sensor body 62 with a curved sliding surface 61, which is coupled with a shaft 63 such that it cannot be turned, said shaft reaching obliquely over the conveying trough and return trough for scraper conveyor 16 in top race 54 A of machine frame 51 of the chain conveyor. Shaft 63 is supported in bearing blocks 64, one of which is indicated schematically at the rear side face of return station 51. The weight of sensor body 62 causes its sliding surface 61 to be directly in contact with the upper face of a scraper 20 or with the upper face of vertical chain links 57 in the area of the measuring zone. At the same time, shaft 63, supported in bearing blocks 64 such that it can swivel, forms a measuring shaft, and by means of shaft encoder 65 the relative position of measuring shaft 63 and thus also the relative position or swiveled position of sensor body 62 rigidly coupled with it may be detected and transmitted to the evaluation and control unit 72 via signal line 71. Depending on the measurement signal of shaft encoder 65, evaluation and control unit 72 then activates tensioning drive 55 of return station 51 via signal line 75.

In an extensive zone within top race 54 A of return station 51, referred to below as the measurement zone, and extending between points 67 and 68 in the drawing marked with double arrows, scraper conveyor 16 has vertical play. In other words, between point 67 and point 68 along the track in top race 54 A, conveyor 16 can essentially move freely in a vertical direction, i.e. perpendicularly to the bottom of top race 73, 74.

In the embodiment shown, the scraper chain is running with optimum tension, i.e. some chain links in the measuring zone are slightly lifted away from the bottom of top race 74. When the chain is dangling, on the other hand, chain links 57, 58 and scrapers 59 within the area of the measuring zone and in the area of the machine frame are in contact at every point with the bottom of top race 73 or 74 of return station 51, and sensor body 62 is at its largest downwards deflection. This state is detected by evaluation and control device 72 and tensioning drive 55 is extended. If the tension of scraper conveyor 16 increases, vertical and horizontal chain links 57, 58 together with scrapers 59 of scraper conveyor 16 may move even higher in the measuring zone, due to the absence of restrictive guidance and the existing vertical play (67 or 68), which causes sensor body 62 to be swiveled clockwise and this deflection to be detected by shaft encoder 65 and transmitted to evaluation and control device 72 as a measurement signal. If the chain reaches a preset tension corresponding to that of a tight chain, this is detected directly by shaft encoder 65 as a result of the greater deflection of sensor body 62, and evaluation and control device 72 then activates tensioning drive 55, in some cases via a closed-loop control algorithm, through signal line 75 such that tensioning cylinder 56 is retracted in order to reduce the tension in scraper conveyor 16.

Other mechanisms for monitoring chain tension include U.S. Pat. Nos. 5,505,293, and 4,657,131.

SUMMARY

This disclosure takes as its starting point the typical longwall conveyor described above where the delivery end is fixed and the return end has a telescopic sliding frame. The principal object of this disclosure is to provide a device for detecting and adjusting the tension of the scraper chain, which determines the tension reliably and simply. Another object of this disclosure is to provide such a device that reliably senses chain tension while at the same time not adversely affecting the chain path.

This disclosure also provides a means of identifying broken chain as it leaves the return sprocket and enters the top race of the conveyor. When detected, the chain can be stopped automatically by the armored face conveyor control system, to avoid the potential for further damage, and warn the operators that repair of the chain is required.

Another principal object of this disclosure is to provide sliding frames at both ends of the conveyor to allow the conveyor ends to be independently adjusted to each end of the coal block, whilst maintaining good chain tension and control.

Providing the delivery and return end frames with a telescopic section addresses the problem of face creep by allowing the operator to quickly adjust the position of both ends of the conveyor, thus offsetting the effects of face creep. This is particularly critical on conventional end discharge conveyor systems, where the correct relationship between the longwall discharge conveyor and an auxiliary cross conveyor (beam stage loader) must be maintained. This problem becomes even more critical where there are two longwall conveyors operating side by side, which is often the case with sub-level caving or longwall to coal caving.

Figure 1:
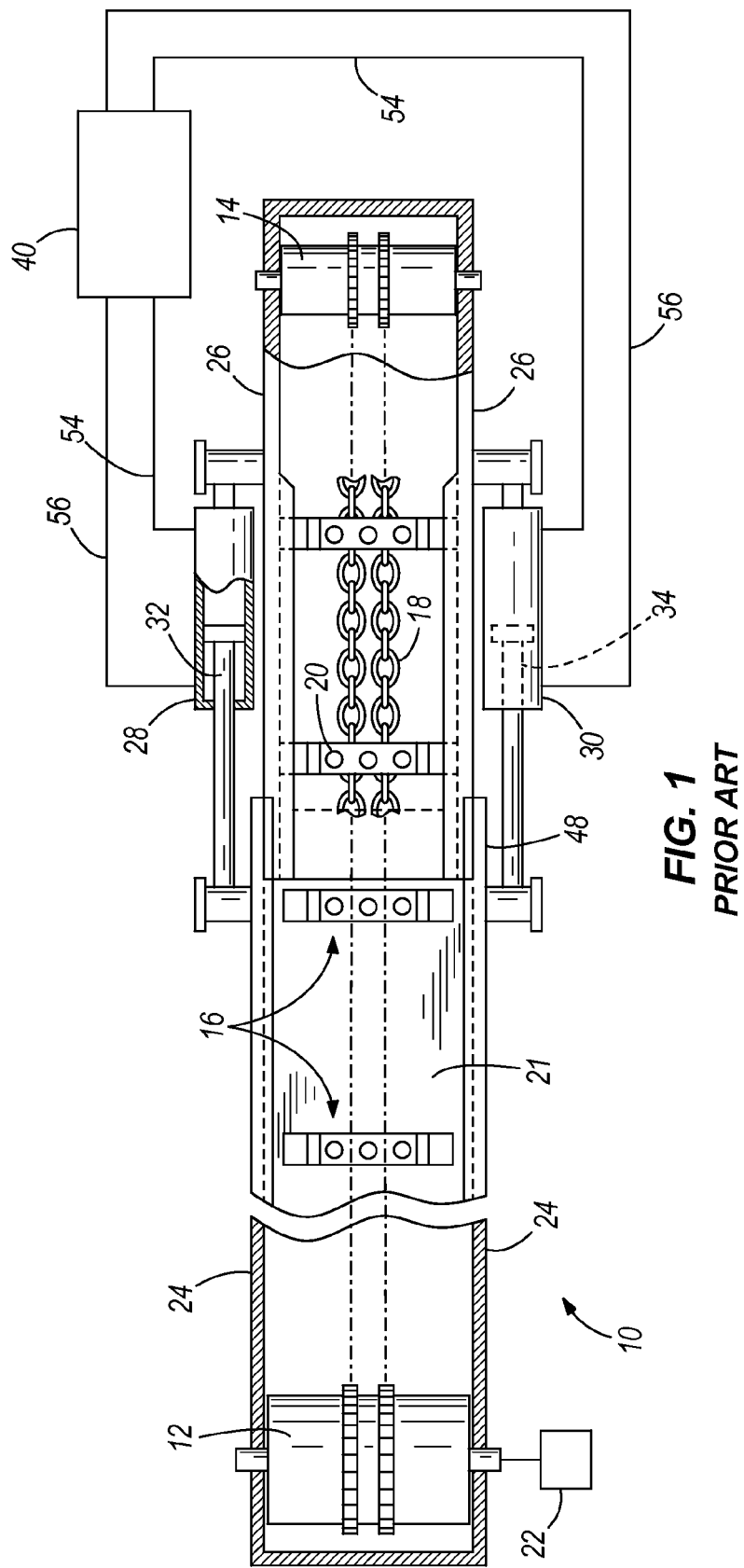
FIG. 1 is a plan view of a prior art delivery discharge end scraper chain conveyor arrangement.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DESCRIPTION OF THE PREFERRED EMBODIMENTS

Figure 2:
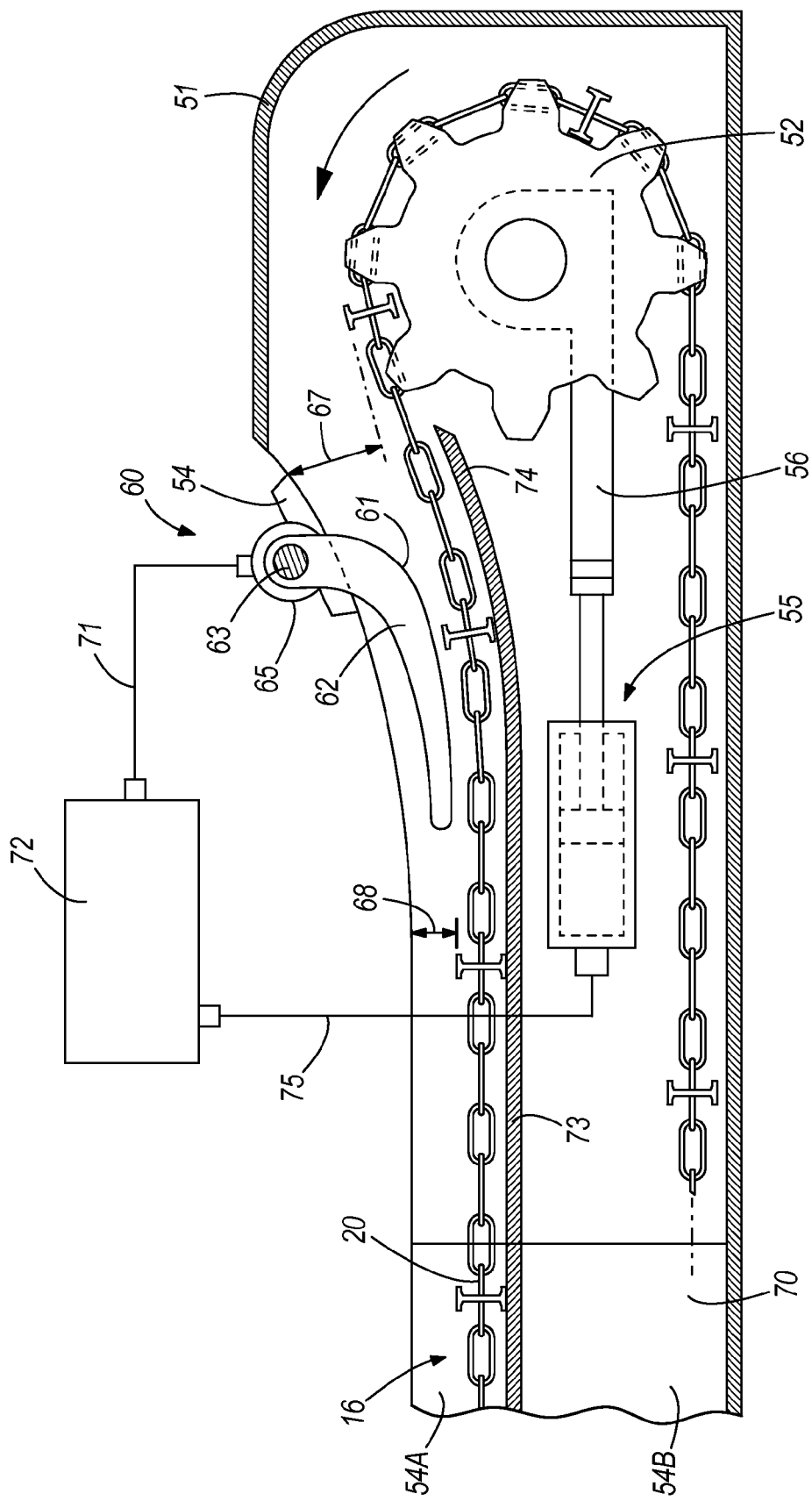
FIG. 2 is a schematic view of a prior art tension sensor for detecting and tensioning a scraper chain.
Figure 3:
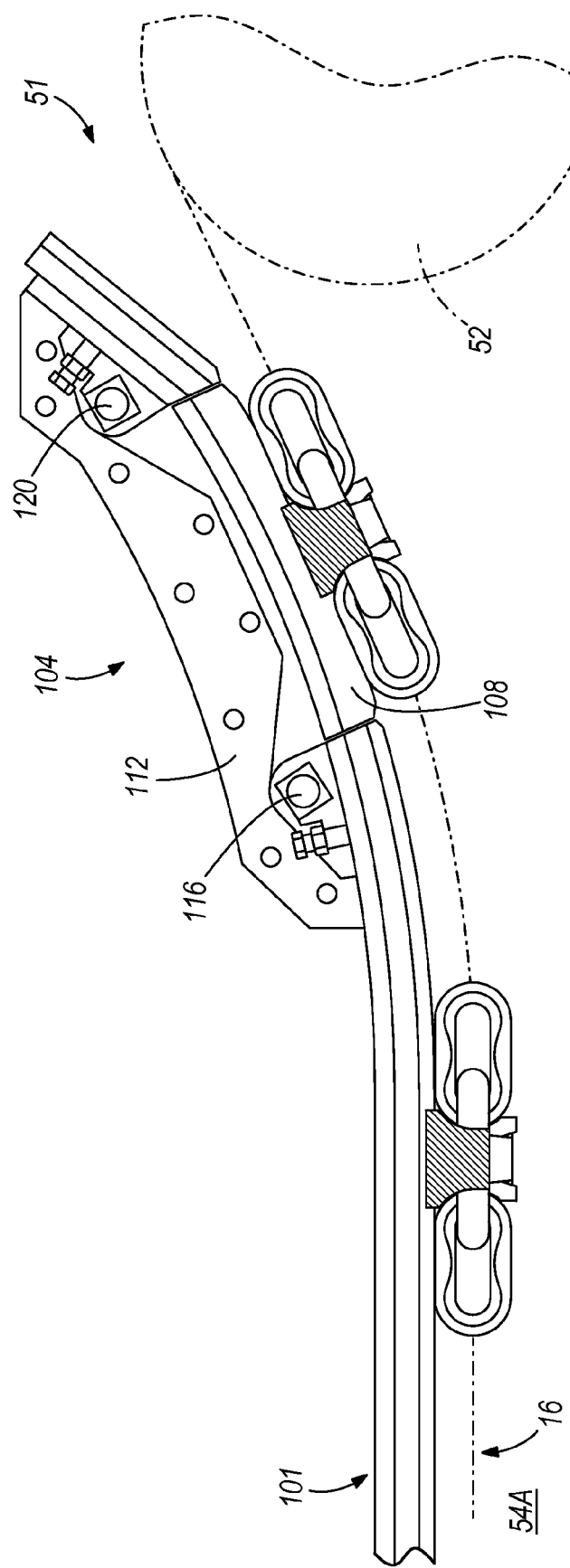
FIG. 3 is a plan view of an improved tension sensor.

FIG. 3 illustrates an improved version of the tension sensing means 60 shown in FIG. 2. Conventionally, to allow for optimum use of the length of the tailgate or return end or station 51, a wear strip 101 is installed to guide the conveyor 16 down to the track or race 54A level. The tensioning means, or tension sensor 104, of FIG. 3, comprises a wear strip 101 including a wear plate 108 that contacts the top surface of the conveyor 16.

The wear plate 108 is supported by a wear strip support 112, and the wear plate 108 is connected to the wear strip support 112 by a pin 116 at one end and a load-sensing pin 120 at the other end. The wear plate 108 engages the top surface of the conveyor 16, and changes the path or trajectory of the movement of the conveyor 16. This contact and change in direction of the conveyor 16 causes a force to be applied on the wear plate 108. The load-sensing pin 120 that connects the wear plate 108 to the wear strip support 112 senses this force. The output from the load-sensing pin 120 is then be used to determine the tension of the conveyor 16, and to adjust the tension, as needed, using any conventional chain tensioning system, such as the joint 48 and pistons 32 and 34 and circuitry of FIG. 1.

Figure 4:
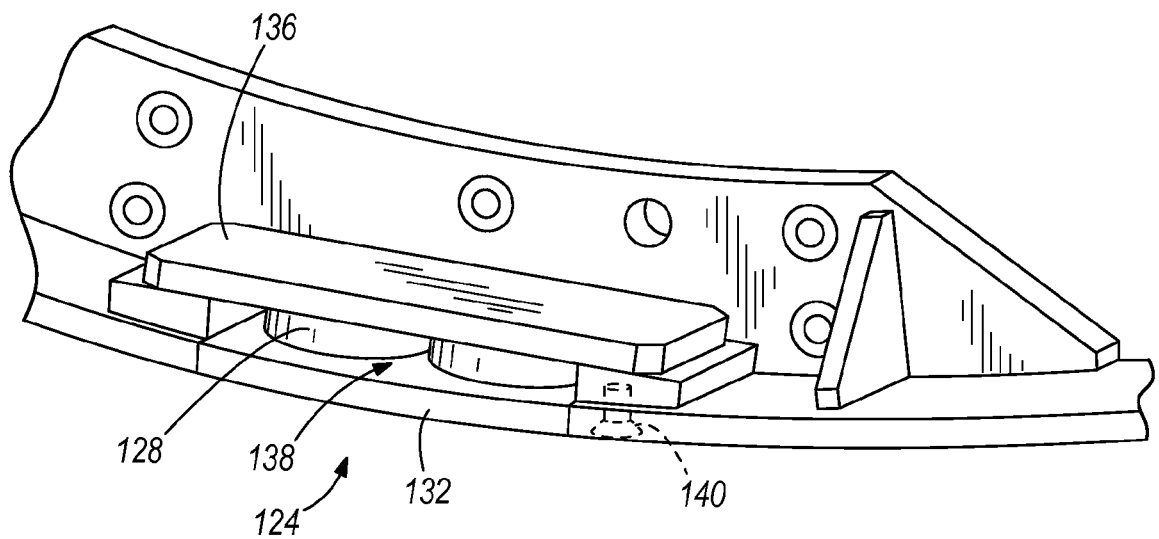
FIG. 4 is a perspective view of an alternate embodiment of the tension sensor shown in FIG. 3.
Figure 6:
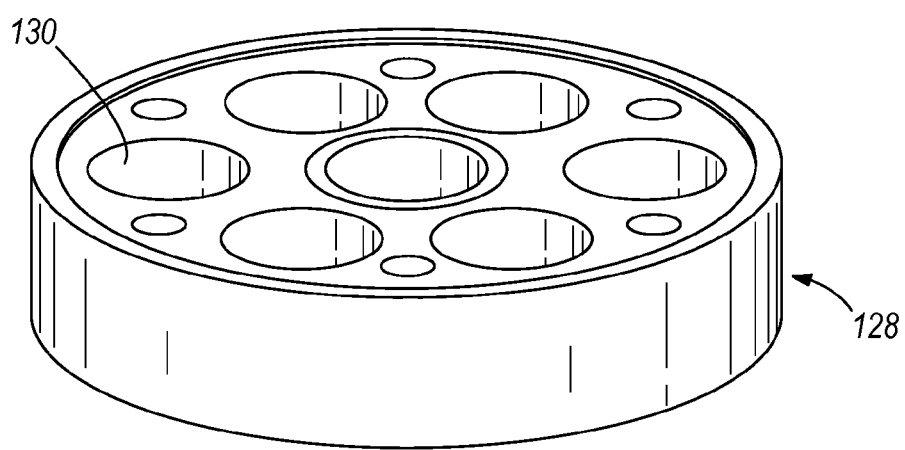
FIG. 6 is a perspective view of a load cell used in the tension sensor of FIGS. 4 and 5.

An alternate and preferred embodiment 124 of the tension sensor is illustrated in FIG. 4. In FIG. 4, a load cell 128 is located between a wear plate 132 and a wear strip support 136. The load cell 128, which is illustrated in FIG. 6, is a cylinder including a plurality of spaced apart passageways 130 through the cylinder. Within the passageways are load sensors (not shown), which measure the compression force on the load cell 128. By placing the load cell 128 between the wear plate 132 and the wear strip support 136, the load cell 128 responds to the force applied to the wear plate 132 by the conveyor 16. In order to provide redundancy, as shown in the preferred embodiment illustrated in FIG. 4, two spaced apart load cells 128 are placed between the wear plate 132 and the wear strip support 136. More particularly, the wear strip support 136 includes a cavity 138 that receives the load cells 128, and the wear plate 132 is connected to the wear strip support 136 by means of a screw 140.

Figure 5:
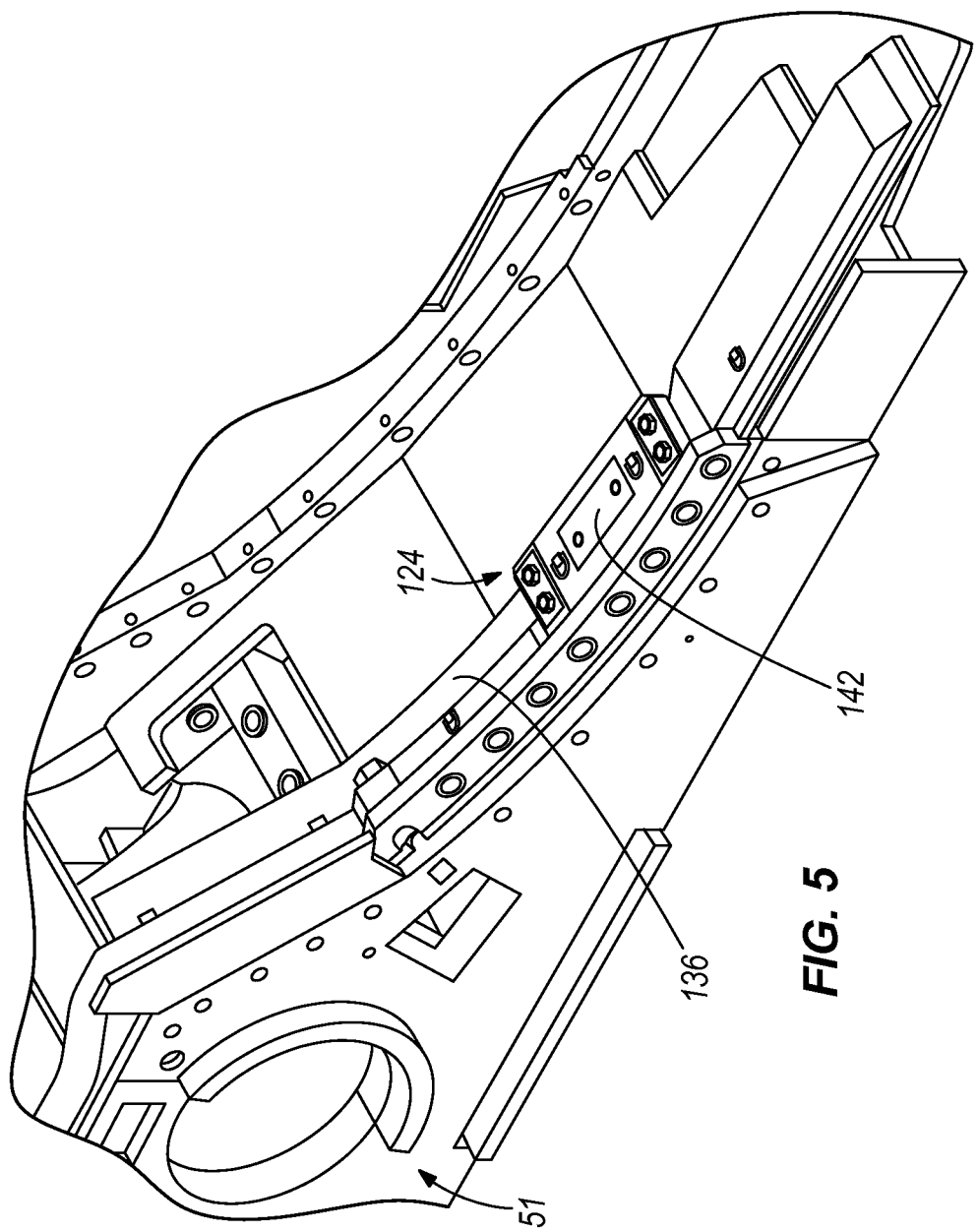
FIG. 5 is a perspective view of the tension sensor shown in FIG. 4, as mounted at the return end of a conveyor.

FIG. 5 illustrates a perspective view of the load sensor 124 mounted on the conveyor apparatus 10 at the return end 51. As shown, the cavity 138 receiving the load cells 128 can be formed by a plate 142 secured to the wear strip support 36. This provides ready access to the load cells 128 from adjacent the conveyor apparatus 10, without the need for significant disassembly of conveyor parts. This thus permits ready access and repair of the tension sensor 124, when the need arises.

Figure 7:
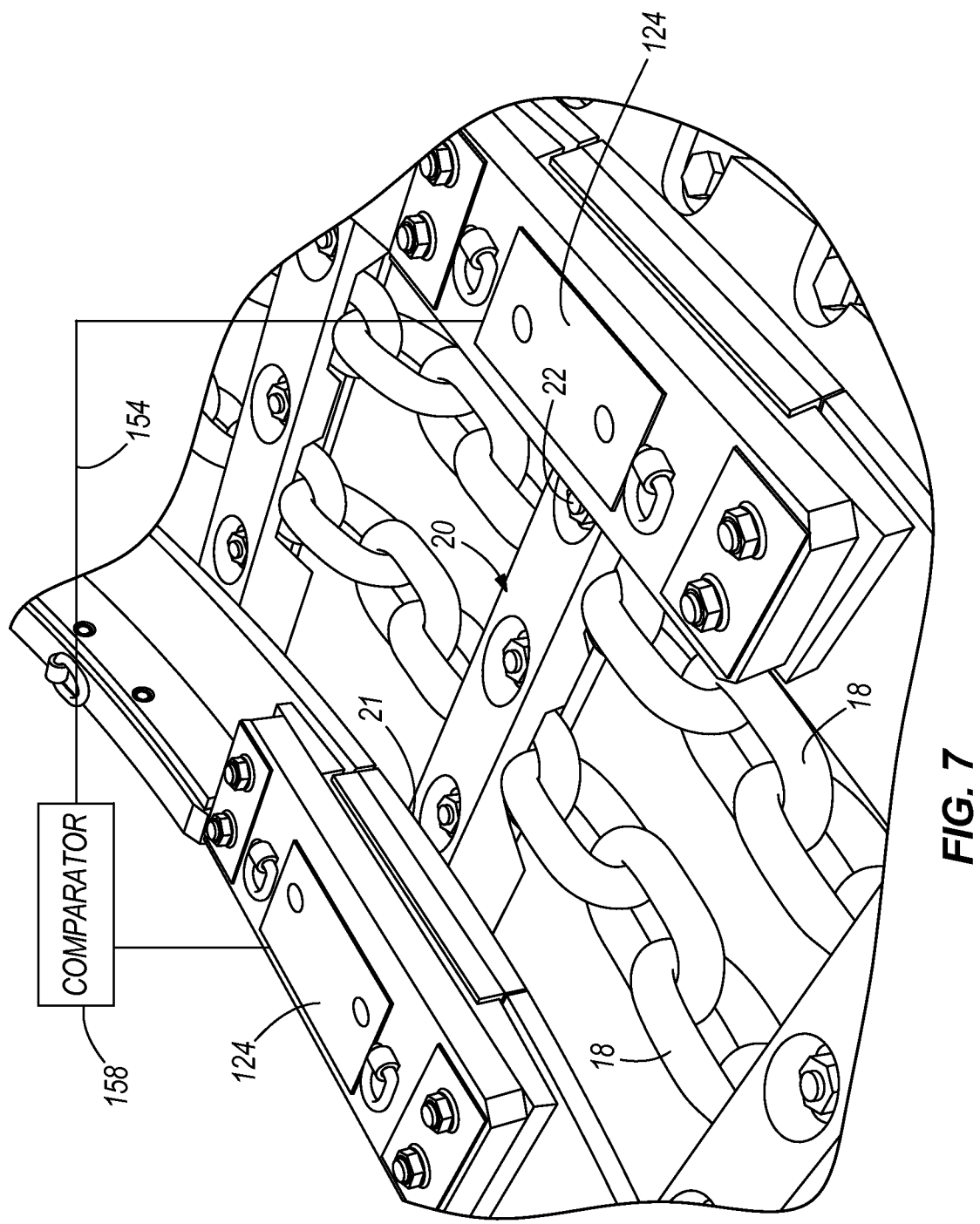
FIG. 7 is a schematic top view of the chain, two tension sensors and a tension control.

The disclosure also illustrates, in FIG. 7, the providing of two such tension sensors on such a conveyor apparatus 10. More particularly, in this embodiment, the conveyor 16 includes the two spaced apart chains 18, and the plurality of flights or flight bars 20 that are connected and spaced apart but between the two chains 18. Each conveyor flight 20 has a first end and a second end. Each flight bar end is spaced apart from its respective adjacent chain. A tension sensor, such as the tension sensor illustrated in FIGS. 2, 3 and 4 above, is provided in a respective wear strip for each one of the two conveyor chains 18. Each tension sensor 124 is electrically connected via a line 154 to a comparator 158.

In the preferred embodiment, as illustrated in FIG. 7, the part of the conveyor that contacts the tension sensor 124 is the end or tip of the flight bar 20. In other embodiments, not shown, a tension sensor 124 can be placed above each of the chains, instead of the flight tips. The tip of the flight bar 20 will only contact the wear strip intermittently. As a result, the tension sensor 124 will only produce intermittent signals.

To eliminate transient load spikes and to allow for the odd missing flight bar 20, the tension sensor 124 collects a rolling average reading over 20 or so flight bars. As each flight bar tip passes along the load sensor, even at a constant chain tension, the signal varies due to the changing geometry of the system. The tension sensor 124 records the peak signal value as each flight bar 20 passes over the wear plate 132. If the rolling average peak reading is too low, then the tension means moves the joint 48 to stretch the chain, or vice versa. The tension means is initialized by establishing a required peak signal value by stopping the conveyor with a flight bar under the sensor, fitting a temporary load transducer to the chain itself, and then moving the joint 48 to tension the static chain. When the chain is at the required tension, the tension sensor 124 stores the signal, and it is this signal value that the tension sensor 124 maintains while the conveyor is running.

The above overview is a simplified version of the sensor signal management system, and applies to steady chain load increase or decrease during the coal cutting cycle. The tension sensor 124 must also deal with special events such as starting a full conveyor or the rapid unloading of a conveyor, like when the shearer stops cutting. Collecting a rolling average signal cannot respond quickly enough to deal with these events, so advance action must be taken. For example, the sprocket is extended to significantly stretch the chain before loaded conveyor startup to prevent generation of slack chain.

In the event of a chain break, the tension in the two chains 18 will be different. The outputs of the tension sensors 124 are compared by a comparing means, comparator 158, and in the event of a significant difference, the operation of the conveying apparatus 10 can be stopped so the broken chain can be repaired. In the preferred embodiment, the tension sensors 124 are provided adjacent the top race of the return end of the conveyor apparatus. If additional sensors or sensing of the tension at other locations in the conveying apparatus is desired, other tension sensors 124, in other locations, can be used. The use of the two tension sensors 124 is also beneficial, for the output from the tension sensors 124 can be averaged to produce a more accurate indication of overall conveyor tension. The comparator 158 forms a part of the chain tensioning system such as the joint 48 and pistons 32 and 34 and circuitry of FIG. 1.

Figure 8:
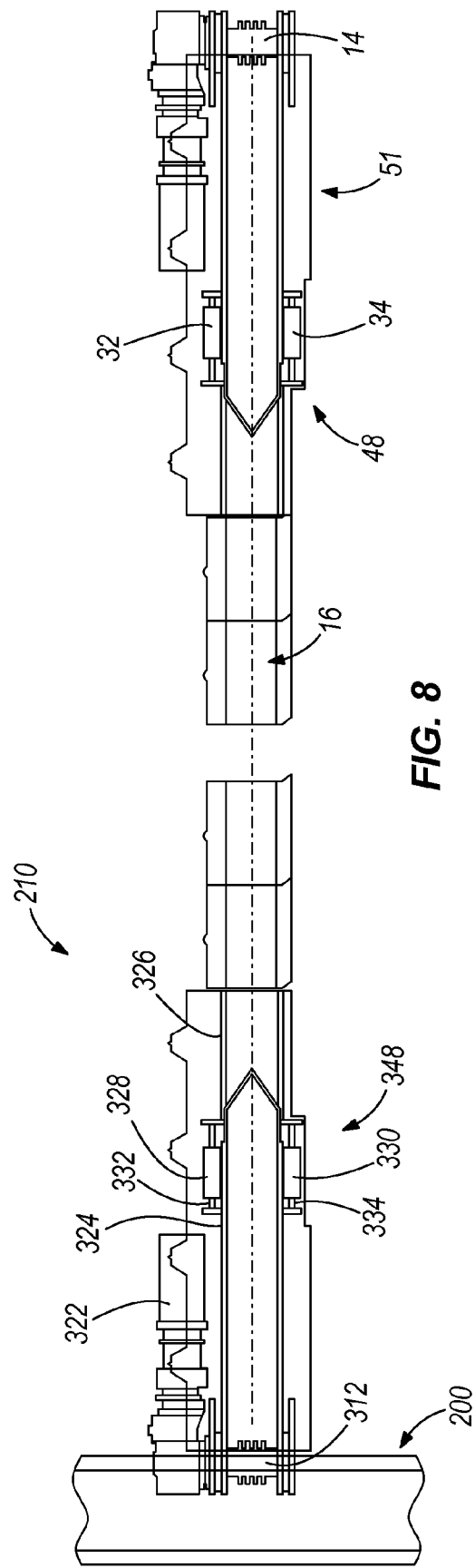
FIG. 8 is a top view of a conveyor and a secondary or auxiliary conveyor.

As illustrated in FIG. 8, an auxiliary or secondary conveyor 200 is located at one end of a conveyor apparatus 210. The material on the conveyor 16 leaves the conveyor and is dumped onto the auxiliary conveyor 200. During operation of the conveyor apparatus 210, the location of the conveyor apparatus 210 may move relative to the location of the auxiliary conveyor 200. Currently, operators need to make various adjustments in order to try to accommodate such movement. This can result in difficulty maintaining conveyor operation.

The improvement in this disclosure is, in order to accommodate some movement of the conveyor apparatus 210 relative to the auxiliary conveyor 200, the conveyor apparatus frame accommodates sliding movement at both ends. At one end, the sliding movement adjusts the tension of the conveyor 16, and sliding movement at the other end accommodates movement of the conveyor apparatus 210 relative to the auxiliary conveyor 200. If the conveyor apparatus 210 moves relative to the auxiliary conveyor 200, an operator can move the sliding end of the conveyor 210 adjacent the auxiliary conveyor 200. Movement of the sliding end of the conveyor 210 can also be occasioned by the use of tensioning means, as described hereinafter, as used on the tensioning end 51 of the conveyor 16. Only in this instance, the movement is not intended to effect the tension of the conveyor 16, but the location of the end of the conveyor apparatus 210 relative to the auxiliary conveyor 200. When movement at this end of the conveyor occurs, the chain tension does change, so the other end of the conveyor apparatus 210 is adjusted by the automatic tensioning means to return the conveyor 16 back to the appropriate tension. Movement of the sliding end of the conveyor 210 adjacent the auxiliary conveyor 200 much overcome the maximum working chain tensions (which are at there highest as these top chains reach this frame; plus significant sliding friction due to the typical large size and weight of the Main gate equipment.

More particularly, a driven drum/sprocket 312 is appropriately coupled to a conveyor drive motor 322. Operation of motor 322 causes the sprocket intermeshing with the dual chains 18 to advance the conveyor 16. More particularly, as illustrated in FIGS. 8 and 11, in addition to the hydraulic pistons 32 and 34 spanning the joint 48 at the return end 51, a pair of sidewalls 324 forming a first portion of a "split frame" of the main gate end of the conveyor apparatus serves to rotatably support the drum/sprocket 312. The sidewalls 324 are illustrated as being telescopingly engaged with a second pair of sidewalls 326 forming a second portion of the frame and, which collectively with sidewalls 324, comprise the aforementioned split frame. The telescoping joint, indicated generally by character numeral 348, permits the frame portions to be moved relative to one another.

Relative movement at the joint 348 between the adjacent sidewalls 324 and 326 thus causes the distance span between the drum/sprockets 312 and 14 to vary accordingly. The conveyor 16 can be provided with increased or reduced tension depending upon the direction of adjusting movement of the supporting drum/sprockets with respect to each other. To provide this relative movement, the conveyor assembly 310 has a pair of hydraulic cylinders 328 and 330, each mounted on and secured to an adjacent sidewall 326. The cylinders have respective pistons 332 and 334, each of which is operatively coupled to a sidewall 324 in any known and expedient manner.

Figure 9:
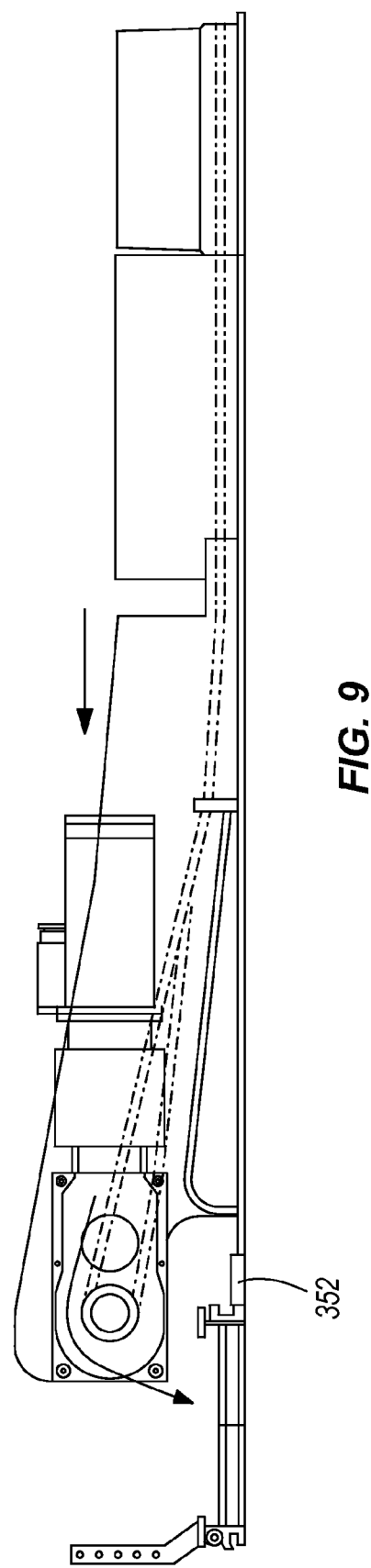
FIG. 9 is a side view of the conveyor and auxiliary conveyor shown in FIG. 8.

The location of the conveyor apparatus relative to the auxiliary conveyor is further illustrated in FIG. 9. If desired, in lieu of operator correction of the location of the conveyor apparatus, the conveyor apparatus can be physically connected by a bar 352 to the auxiliary conveyor. In this instance, tension is maintained at this end of the conveyor by some tensioning means, such as the tensioning means previously described. But in order to accommodate some movement in the event the auxiliary conveyor and main conveyor change location, either a hydraulic accumulator (now shown), or some relief valve (now shown) must be provided in the hydraulic tensioning means in order to allow for the movement of this sliding end of the conveyor apparatus 210. When this end of the conveyor apparatus 210 adjusts by movement of the auxiliary conveyor 200, then tension is corrected, as described before, by the return end 51.

Figure 10A:
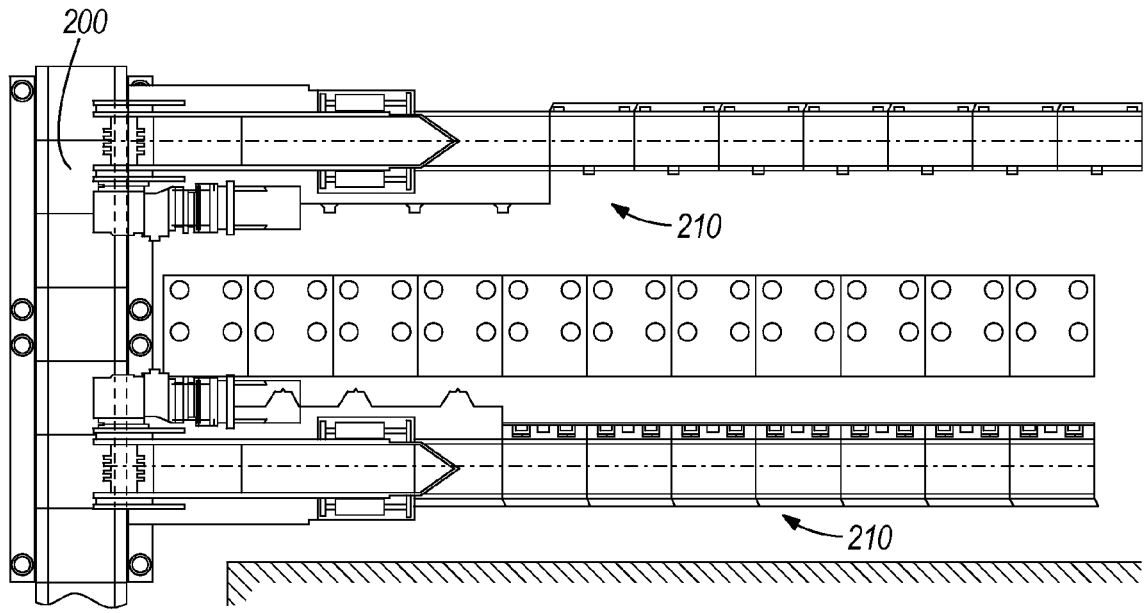
FIG. 10 is a top view of a double conveyor system.
Figure 10B:
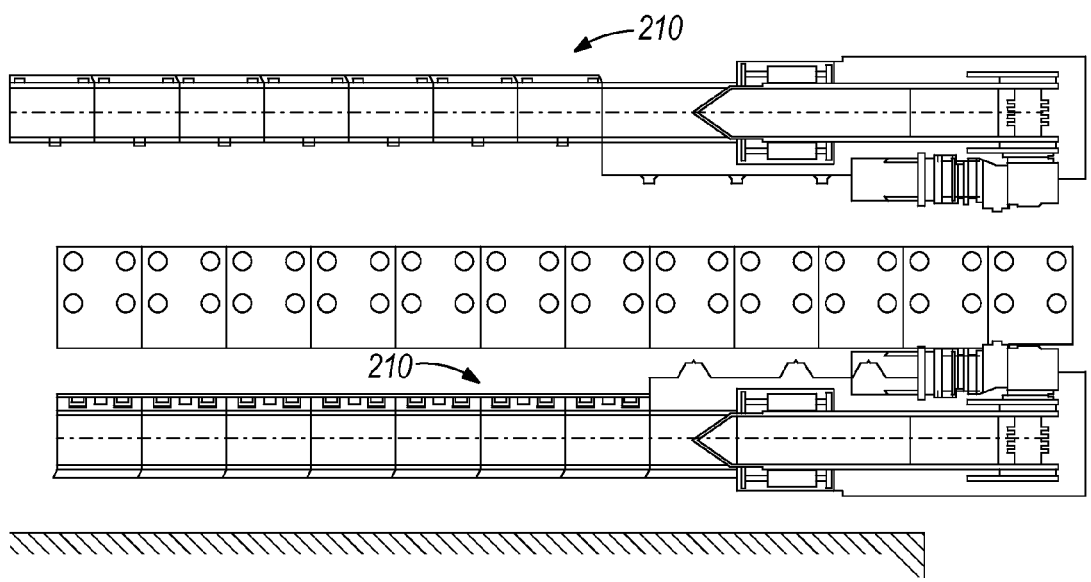

The problem of conveyor apparatus movement relative to the auxiliary conveyor is especially relevant where a pair of conveyor apparatus is used. As illustrated in FIGS. 10 A and 10 B, it is known to use one conveyor adjacent a coal face, and a second conveyor apparatus behind the roof supports to collect coal that falls from the longwall roof as the longwall advances. In this instance, the double sliding frame ends would be used with both conveyor apparatus.

Additionally the frame-sliding 48 and 348 can be adjusted to correctly align the conveyor end with both edges of the coal block, moving both the return end frame and delivery end frame at the same time to maintain correct chain tension during this adjustment. This would not be a normal requirement or mode of operation as the position of the Return End Frame to coal block is less critical in most cases.

This aspect of the disclosure thus has the following benefits. Manual or automatic control of the delivery end frame sliding module makes fine adjustments for optimum discharge of material from the extendable longwall armored face conveyor to the cross beam stage loader conveyor.

Since the changes in the overall length of the conveyor, as a result of adjusting the delivery end sliding frame module will change the chain tension, adjustments must be in small increments and effected slowly to give the automatic chain tensioning system time to react. At all times it is the automatic chain tensioning system that controls and maintains correct chain tension, not the adjustment of the delivery end frame module.

Various other features and advantages of the disclosure will be apparent from the following claims.

The invention claimed is:
1. A conveyor apparatus comprising:
an endless conveyor,
a frame having first and second adjacent portions movable with respect to each other,
a drive sprocket for supporting and driving one end of said conveyor,
a return sprocket for supporting the other end of said conveyor,
an actuator mounted on said frame and spanning the first and second portions of said frame to move said drive sprocket and said return sprocket with respect to each other and adjust a tension in the conveyor, and
a top flange wear strip on said frame mounted adjacent the conveyor to deflect the conveyor path down to a track level, said wear strip including
a wear strip support,
a wear strip plate that deflects and contacts an upper surface of said conveyor, and
a load sensor mounted between said wear strip plate and said wear strip support and operable to sense a force exerted by the conveyor.
2. The conveyor apparatus of claim 1, wherein the force is used to determine a tension on the conveyor, and wherein the actuator is operable to adjust the tension on the chain based on the sensed force.
3. The conveyor apparatus of claim 2, further comprising a controller operable to collect a rolling average of maximum readings from said load sensor to determine the tension of the conveyor.
4. The conveyor apparatus of claim 1, wherein the load sensor includes a load sensing pin.
5. The conveyor apparatus of claim 4, wherein the wear strip plate is coupled to the wear strip support by the load sensing pin.
6. The conveyor apparatus of claim 1, wherein the load sensor includes a load cell operable to measure the force exerted on the wear strip plate by the conveyor.
7. The conveyor apparatus of claim 6, wherein the load sensor includes two spaced apart load cells operable to measure the force exerted on the wear strip plate by the conveyor.

8. The conveyor apparatus of claim 6, wherein the wear strip plate and the wear strip support form a cavity therebetween, and wherein the load cell is positioned in the cavity.

9. The conveyor apparatus of claim 8, wherein the load sensor includes two spaced apart load cells operable to measure the force exerted on the wear strip plate by the conveyor, the load cells being positioned in the cavity.

10. The conveyor apparatus of claim 1, wherein the conveyor includes two spaced apart chains, wherein the first-mentioned load sensor senses a force to determine a tension in one of the chains, and wherein the conveyor apparatus further comprises a second load sensor operable to sense another force to determine a tension in the other of the chains.

11. The conveyor apparatus of claim 1, wherein the wear strip plate is mounted relative to the load sensor to apply a force to the load sensor upon deflection of the wear strip plate.

12. The conveyor apparatus of claim 1, wherein the load sensor is operable to sense a compression force applied to the load sensor.

13. The conveyor apparatus of claim 1, wherein the wear strip plate intermittently contacts said conveyor.

14. The conveyor apparatus of claim 7, wherein the conveyor extends along an axis, and wherein the load cells are positioned on one side of the axis.

15. A conveyor apparatus comprising:
an endless conveyor,
a frame having first and second adjacent portions movable with respect to each other,
a drive sprocket for supporting and driving one end of said conveyor,
a return sprocket for supporting the other end of said conveyor,
an actuator mounted on said frame and spanning the first and second portions of said frame to move said drive sprocket and said return sprocket with respect to each other, and
a top flange wear strip on said frame mounted adjacent the conveyor to deflect the conveyor path down to a track level, said wear strip including
a wear strip support,
a wear strip plate that deflects and contacts a surface of said conveyor, and
a load sensor mounted between said wear strip plate and said wear strip support and operable to sense a force exerted by the conveyor, wherein the load sensor includes a load sensing pin.

16. The conveyor apparatus of claim 15, wherein the force is used to determine a tension on the conveyor, and wherein the actuator is operable to adjust the tension on the chain based on the sensed force.

17. The conveyor apparatus of claim 16, further comprising a controller operable to collect a rolling average of maximum readings from said load sensor to determine the tension of the conveyor.

18. The conveyor apparatus of claim 15, wherein the wear strip plate is coupled to the wear strip support by the load sensing pin.

19. The conveyor apparatus of claim 15, wherein the wear strip plate is mounted relative to the load sensor to apply a force to the load sensor upon deflection of the wear strip plate.

20. The conveyor apparatus of claim 15, wherein the load sensor is operable to sense a compression force applied to the load sensor.

* * * * *